US008450882B2

(12) United States Patent
Anjima et al.

(10) Patent No.: US 8,450,882 B2
(45) Date of Patent: May 28, 2013

(54) ENERGIZATION CONTROL APPARATUS

(75) Inventors: Teruyuki Anjima, Tokai (JP); Masaaki Niwa, Nagoya (JP); Hiroaki Ikenaga, Nagoya (JP); Takashi Mizutani, Yokkaichi (JP)

(73) Assignee: Denso Corporation, Kariya (JP)

( * ) Notice: Subject to any disclaimer, the term of this patent is extended or adjusted under 35 U.S.C. 154(b) by 275 days.

(21) Appl. No.: 12/932,411

(22) Filed: Feb. 24, 2011

(65) Prior Publication Data
US 2011/0215653 A1 Sep. 8, 2011

(30) Foreign Application Priority Data

Mar. 2, 2010 (JP) .................................. 2010-45710

(51) Int. Cl.
*B60Q 1/00* (2006.01)
(52) U.S. Cl.
CPC ....................................... *B60Q 1/00* (2013.01)
USPC ............................ 307/131; 307/9.1; 307/10.1
(58) Field of Classification Search
CPC ....................................................... B60Q 1/00
USPC .......................................... 307/9.1, 10.1, 131
See application file for complete search history.

(56) References Cited

U.S. PATENT DOCUMENTS

| 4,259,659 A | 3/1981 | Ariyoshi et al. | |
|---|---|---|---|
| 6,844,681 B2 * | 1/2005 | Serizawa et al. | 315/77 |
| 8,227,994 B2 * | 7/2012 | Shibata et al. | 315/77 |
| 2010/0079071 A1 * | 4/2010 | Shibata et al. | 315/77 |

FOREIGN PATENT DOCUMENTS

| JP | 55-39869 | 3/1980 |
|---|---|---|
| JP | 55-106832 | 8/1980 |
| JP | 58-170237 | 11/1983 |
| JP | 2000-245054 | 9/2000 |
| JP | 2004-009825 | 1/2004 |
| JP | 2007-15654 | 1/2007 |
| JP | 2007-246017 | 9/2007 |
| JP | 2009-241665 | 10/2009 |

OTHER PUBLICATIONS

Office action dated Jan. 17, 2012 in corresponding Japanese Application No. 2010-045710 with English translation.
Office Action dated Jan. 17, 2012 in JP Application No. 2010-045710 with English translation thereof.

* cited by examiner

*Primary Examiner* — Adi Amrany
(74) *Attorney, Agent, or Firm* — Harness, Dickey & Pierce, PLC

(57) ABSTRACT

An energization control apparatus includes a control portion, a disconnection detecting portion, and a prohibiting portion. The control portion controls energization to a plurality of loads coupled in parallel. The disconnection detecting portion repeatedly or continuously determines whether a supply current to the plurality of loads is less than a threshold value when the control portion energizes the plurality of loads, and the disconnection detecting portion detects a disconnection of a part of the plurality of loads when the supply current is less than the threshold value. The prohibiting portion prohibits a disconnection detection by the disconnection detecting portion for a predetermined period since the control portion starts to energize the plurality of loads, and the prohibiting portion enables the disconnection detection by the disconnection detecting portion after the predetermined period elapses.

2 Claims, 3 Drawing Sheets

ENERGIZATION CONTROL APPARATUS

CROSS REFERENCE TO RELATED APPLICATIONS

The present application is based on and claims priority to Japanese Patent Application No. 2010-45710 filed on Mar. 2, 2010, the contents of which are incorporated in their entirety herein by reference.

BACKGROUND OF THE INVENTION

1. Field of the Invention

The present invention relates to an energization control apparatus that controls energization to a plurality of loads coupled in parallel.

2. Description of the Related Art

JP-A-55-106832 (corresponding to U.S. Pat. No. 4,259,659) discloses a flasher apparatus that includes a direction indicator for a vehicle as a plurality of loads coupled in parallel. The apparatus further includes a circuit for detecting an excessive current so as to detect a short fault of the direction indicator. The apparatus prohibits a detection of an excessive current for a predetermined period since energization to the direction indicator is started so as to distinguish an excessive current due to a short fault and an inrush current at the start of energization.

JP-A-2000-245054 discloses a circuit for detecting a short or a disconnection of a load. In addition, each of JP-A-2007-15654 and JP-A-2009-241665 discloses an apparatus for detecting a disconnection of a load, and the apparatus compensates a threshold value for determining a disconnection.

In the apparatuses described in the above-described documents, influence of an inrush current to a disconnection detection is not considered. Thus, a disconnection may be detected by error due to the inrush current.

For example, in a case where a disconnection of a load is detected based on a supply current to a plurality of loads coupled in parallel, it is required to detect a decrement of the supply current to a load group. However, an inrush current at the start of energization may cover the decrement of the supply current due to a disconnection. Thus, a normal determination may be made even when a disconnection occurs. In addition, even after a disconnection is detected, a temporary inrush current may cause a normal determination.

In order to reduce influence of an inrush current, a supply current may be detected at a predetermined period since energization is started, and the detected supply current may be compared with a threshold value for detecting a disconnection. However, the above-described method cannot detect a decrement of the supply current after the supply current is detected.

In an energization control apparatus for a direction indicator for a vehicle, when a disconnection is detected, a blink period is shortened so as to inform a user. In this case, even when a disconnection occurs in a part of loads, the energization control apparatus needs to energize the other part of loads with a short period. However, when a disconnection is detected based on a disappearance of the inrush current, the direction indicator may be forcibly put out before a required lighting period elapses.

SUMMARY OF THE INVENTION

In view of the foregoing problems, it is an object of the present invention to provide an energization control apparatus that can reduce influence of an inrush current and can detect a disconnection.

An energization control apparatus according to an aspect of the present invention includes a control portion, a disconnection detecting portion, and a prohibiting portion. The control portion controls energization to a plurality of loads coupled in parallel. The disconnection detecting portion repeatedly or continuously determines whether a supply current to the plurality of loads is less than a threshold value when the control portion energizes the plurality of loads, and the disconnection detecting portion detects a disconnection of a part of the plurality of loads when the supply current is less than the threshold value. The prohibiting portion prohibits a disconnection detection by the disconnection detecting portion for a predetermined period since the control portion starts to energize the plurality of loads, and the prohibiting portion enables the disconnection detection by the disconnection detecting portion after the predetermined period elapses.

In the energization control apparatus, the disconnection detection is prohibited for the predetermined period. Thus, influence of an inrush current can be reduced. Furthermore, because the disconnection detection is repeatedly or continuously performed after the predetermined period elapses, generation of a disconnection can be quickly detected.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS (First Embodiment)

Figure 1:
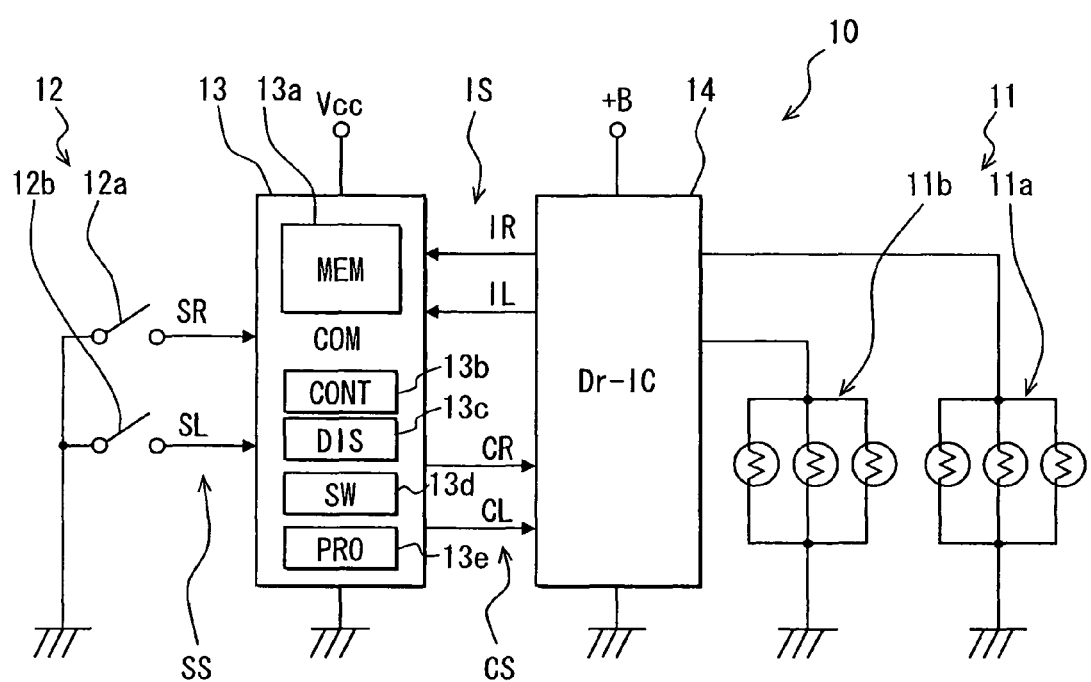
FIG. 1 is a diagram showing an energization control apparatus according to a first embodiment of the present invention.

An energization control apparatus 10 according to a first embodiment of the present invention will be described with reference to FIG. 1. The energization control apparatus 10 can be used for a direction indicator for a vehicle. The energization control apparatus 10 supplies electricity to a load group based on instructions of a user of the vehicle.

The energization control apparatus 10 includes a direction indicator 11. The direction indicator 11 includes a right-turn indicator 11a and a left-turn indicator 11b. Each of the right-turn indicator 11a and the left-turn indicator 11b can operate as a load group. The right-turn indicator 11a includes a plurality of light emitting elements that can operate as a plurality of loads. Each of the light emitting elements includes a light bulb or a light emitting diode. The loads may also include a buzzer. The light emitting elements include light-emitting elements disposed outside the vehicle and a light-emitting element disposed in a dashboard in a vehicle. The loads are coupled in parallel with each other. The left-turn indicator 11b also includes a plurality of light emitting elements same as the right-turn indicator 11a. The left-turn indicator 11b and the right-turn indicator 11a are symmetrically arranged on the vehicle.

The energization control apparatus 10 includes an instruction device 12 that instructs a start and an end of an operation of the direction indicator 11. The instruction device 12 is disposed in the vicinity of a steering wheel of the vehicle. When the instruction device 12 is operated by a user, the instruction device 12 outputs an instruction signal SS. The instruction device 12 includes a right operation switch 12a and a left operation switch 12b. The instruction signal SS includes a right instruction signal SR and a left instruction signal SL. The instruction device 12 selectively outputs the right instruction signal SR and the left instruction signal SL. When the right operation switch 12a is operated by the user, the instruction device 12 outputs the right instruction signal SR. When the left operation switch 12b is operated by the user, the instruction device 12 outputs the left instruction signal SL.

The energization control apparatus 10 includes a control device 13 that controls energization to the loads. The control device 13 is a microcomputer (COM) including a memory (MEM) 13a. The memory 13a stores a predetermined program. The control device 13 executes the program stored in the memory 13a, and thereby the energization control apparatus 10 operates as described in the present specification. The control device 13 receives a stabilized power supply Vcc.

The control device 13 includes a control portion (CONT) 13b that controls energization to the direction indicator 11 so as to operate the direction indicator 11 in response to the instruction signal SS from the instruction' device 12. The control portion 13b alternately switches an on-state where electricity is supplied to the direction indicator 11 and an off-state where electricity is not supplied to the direction indicator 11. The control device 13 receives the instruction signal SS from the instruction device 12. The control device 13 outputs a control signal CS based on the instruction signal SS. The control device 13 periodically switches the control signal CS between an on-signal and an off-signal. The control signal CS includes a right control signal CR for intermittently controlling the right-turn indicator 11a and a left control signal CL for intermittently controlling the left-turn indicator 11b.

The control device 13 also receives a current signal IS. The current signal IS indicates a value of electric current supplied to the loads, that is, a value of supply current. The current signal IS includes a right current signal IR that indicates a supply current to the right-turn indicator 11a and a left current signal IL that indicates a supply current to the left-turn indicator 11b.

The control device 13 further includes a disconnection detecting portion (DIS) 13c that detects a partial disconnection of the direction indicator 11 based on the current signal IS. When the control portion 13b energizes the direction indicator 11, the disconnection detecting portion 13c repeatedly or intermittently detects a disconnection based on the current signal IS. The disconnection detecting portion 13c detects a disconnection of the load included in the right-turn indicator 11a based on the right current signal IR. The disconnection detecting portion 13c detects a disconnection of the load included in the left-turn indicator 11b based on the left current signal IL.

The control device 13 further includes a switching portion (SW) 13d that switches an intermittent period of energization to the direction indicator 11 between a first period TL and a second period TS based on the presence or absence of a disconnection. The first period TL is longer than the second period TS. When a partial disconnection of the direction indicator 11 is not detected, the switching portion 13d sets the intermittent period of the control signal CS to the first period TL. When a partial disconnection of the direction indicator 11 is detected, the switching portion 13d sets the intermittent period of the control signal CS to the second period TS. Thus, the intermittent period of the direction indicator 11 is switched from the first period TL to the second period TS when a partial disconnection is detected.

The first period TL includes a first on-period TonL and a first off-period ToffL. The second period TS includes a second on-period TonS and a second off-period ToffS. During the first on-period TonL and the second on-period TonS, the control portion 13b energizes the loads. During the first off-period ToffL and the second off-period ToffS, the control poerion 13b deenergizes the loads. The first on-period TonL and the second on-period TonS are also referred to as an energization period. The first off-period ToffL and the second off-period ToffS are also referred to as an interrupt period.

The first period TL can be expressed as TL=TonL+ToffL. The second period TS can be expressed as TS=TonS+ToffS. The second on-period TonS is shorter than the first on-period TonL. The second off-period ToffS is shorter than the first off-period ToffL. The second on-period TonS is shorter than the second off-period ToffS. For example, the first on-period TonL and the second off period ToffL may be 350 ms, the second on-period TonS may be 110 ms, and the second off-period ToffS may be 200 ms.

The control device 13 further includes a prohibiting portion 13e. The prohibiting portion 13e prohibits a disconnection detection by the disconnection detecting portion 13c during the second on-period TonS, and the prohibiting portion 13e enables the disconnection detection by the disconnection detecting portion 13c after the second on-period TonS elapses. Only after the elapse of the second on-period TonS, the disconnection detecting portion 13c repeatedly or intermittently performs the disconnection detection for detecting a partial disconnection of the direction indicator 11 based on the current signal IS. The prohibiting portion 13e prohibits the disconnection detection for the second on-period TonS since the control portion 13b starts to energize the loads. The second on-period TonS can function as a mask period for restricting an error determination due to an inrush current. The second on-period TonS is longer than an initial impulse period of the inrush current so that the second on-period TonS include the initial impulse period. Thus, influence of an initial part of the inrush current can be reduced. The length of the second on-period TonS may be set in such a manner that the second on-period TonS elapses when a part of the inrush current remains. The disconnection detecting portion 13c repeatedly or intermittently monitors the current signal IS and detects a disconnection during a period after the second on-period TonS elapses and before the first on-period TonL elapses.

The control device 13 includes a set of the control portion 13b, the disconnection detecting portion 13c, the switching portion 13d, and the prohibiting portion 13e. Because the right instruction signal SR and the left instruction signal SL is selectively input, the control device 13 provides the same function to a right system and a left system. Thus, the set of the control portion 13b, the disconnection detecting portion 13c, the switching portion 13d, and the prohibiting portion 13e are shared by a plurality of systems including the right system and the left system. The control portion 13b, the disconnection detecting portion 13c, the switching portion 13d, and the prohibiting portion 13e in the control device 13 may be called functional blocks or modules.

The energization control apparatus 10 further includes a driving circuit 14. The driving circuit 14 includes a driver integrated circuit (Dr-IC) for driving the loads. The driving circuit 14 receives the control signal CS and energizes or deenergizes the direction indicator 11 based on the control signal CS. The driving circuit 14 outputs the current signal IS that indicates the supply current to the direction indicator 11. The driving circuit 14 energizes or deenergizes the right-turn indicator 11a based on the right control signal CR. At the same time, the driving circuit 14 outputs the right current signal IR that indicates the supply current to the right-turn indicator 11a. The driving circuit 14 energizes or deenergizes the left-turn indicator 11b based on the left control signal CL. At the same time, the driving circuit 14 outputs the left current signal IL that indicates the supply current to the left-turn indicator 11b. The driving circuit 14 receives a voltage +B of an in-vehicle battery.

An operation of the energization control apparatus 10 according to the present embodiment will be described with reference to the flow diagram shown in FIG. 2. The flow diagram is stored in the memory 13a as the program and is executed by the control device 13. In the flow diagram, the right instruction signal SR, the right control signal CR, and the right current signal IR, or the left instruction signal SL, the left control signal CL, and the left current signal IL are selectively applied to the instruction signal SS, the control signal CS, and the current signal IS, respectively.

Figure 2:
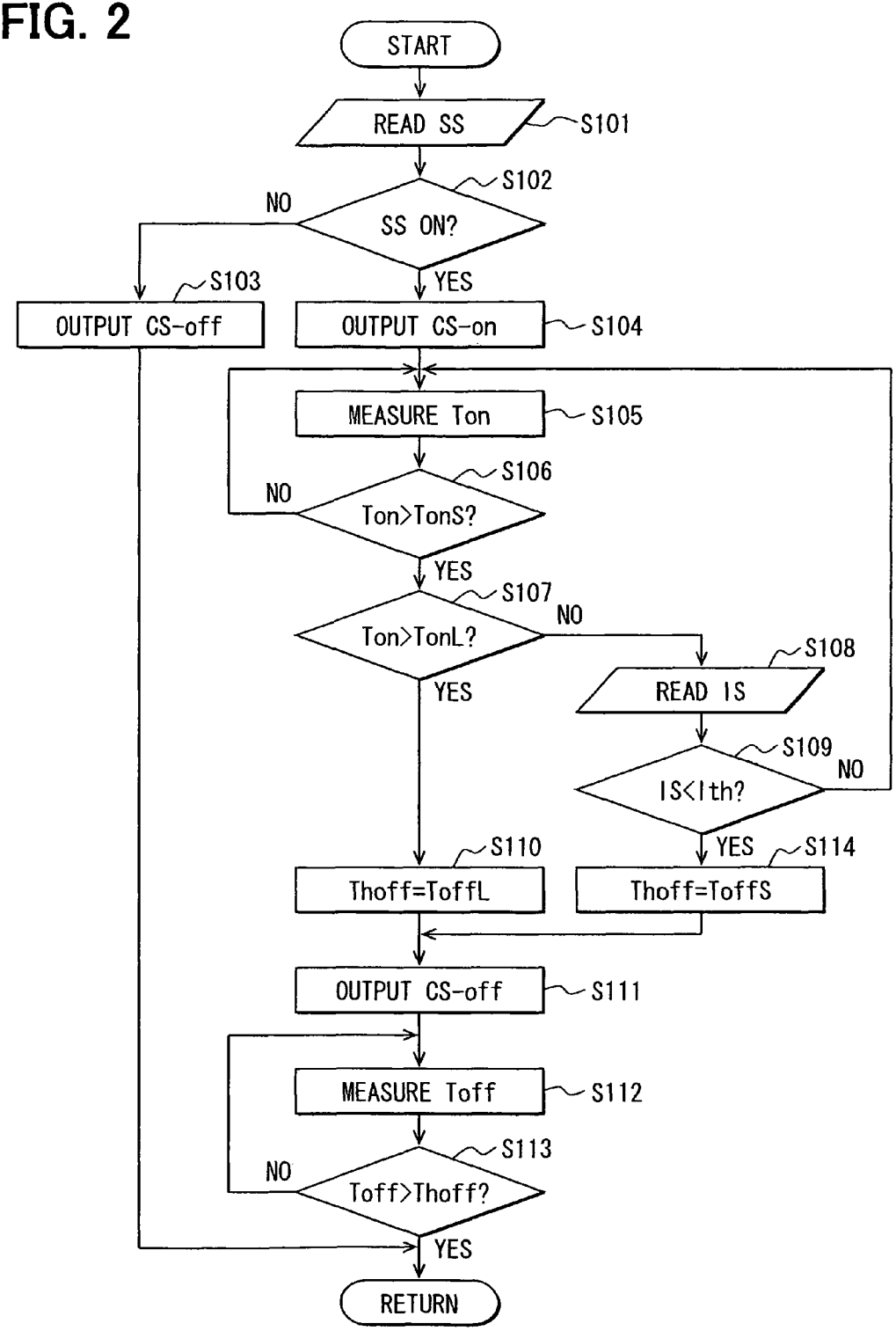
FIG. 2 is a flow diagram showing a process performed by a control device in the energization control apparatus.

The control device 13 repeats the process shown in FIG. 2 so that the direction indicator 11 blinks. At S101, the control device 13 reads the instruction signal SS. At S102, the control device 13 determines whether the instruction signal SS is in the on-state. When the control device 13 determines that the instruction signal SS is not in the on-state, which corresponds to "NO" at S102, the process proceeds to S103. At S103, the control device 13 outputs an off-signal CS-off. Accordingly, the direction indicator 11 is in a waiting state.

When the control device 13 determines that the instruction signal SS is in the on-state, which corresponds to "YES" at S102, the process proceeds to S104. At S104, the control device 13 outputs an on-signal CS-on. Accordingly, the direction indicator 11 is turned on. When the right instruction signal SR is in the on-state, the right-turn indicator 11a is turned on. When the left instruction signal SL is in the off-state, the left-turn indicator 11b is turned on.

At S105, the control device 13 measures the actual on-period Ton of the direction indicator 11. At S106, the control device 13 determines whether the actual on-period Ton is more than the second on-period TonS. When the control device 13 determines that the actual on-period Ton is not more than the second on-period TonS, which corresponds to "NO" at S106, the process returns to S105. Thus, the process from S105 to S106 is repeated until the actual on-period Ton exceeds the second on-period TonS. Accordingly, the control portion 13b energizes the direction indicator 11 during the second on-period TonS.

When the control device 13 determines that the actual on-period Ton is more than the second on-period TonS, which corresponds to "YES" at S107, the process proceeds to S107. At S107, the control device 13 determines whether the actual on-period Ton is more than the first on-period TonL. When the control device 13 determines that the actual on-period Ton is not more than the first on-period TonL, which corresponds to "NO" at S107, the process proceeds to S108. When the control device 13 determines that the actual on-period Ton is more than the first on-period TonL, which corresponds to "YES" at S107, the process proceeds to S110. A loop from S105 to S107 provides an on-loop where an on-state by the on-signal CS-on is maintained from when the second on-period TonS elapses to when the first on-period TonL elapses.

At S108, the control device 13 reads the current signal IS. When the right-turn indicator 11a is lighted, the right current signal IR is input. When the left-turn indicator 11b is lighted, the left current signal IL is input. At S109, the control device 13 determines whether the current signal IS is less than a threshold value Ith. The threshold value Ith is a value for detecting a disconnection of a part of the loads included in the direction indicator 11. The threshold value is slightly greater than the value of the supply current at a time when a part of the loads included in the direction indicator 11 is disconnected. When the control device 13 determines that the current signal IS is not less than the threshold value Ith, which corresponds to "NO" at S109, the process returns to S105. Thus, when the current signal IS is not less than the threshold value Ith, an on-loop from S105 to S109 is repeated. While the on-loop is repeated, energization to the direction indicator 11 is continued. Furthermore, while the on-loop is repeated, the process at S108 and S109 is repeatedly performed. The process from S104 to S109 provides a lighting process. In addition, the process at S108 and S109 provides a disconnection detecting process. The process at S108 and S109 is included in the on-loop.

When the actual on-period Ton exceeds the first on-period TonL during the lighting process, the process proceeds from S107 to S110. Thus, the disconnection detecting process is repeatedly performed from when the second on-period TonS elapses to when the first on-period TonL elapses. At S110, the control device 13 sets an off-period Thoff of the direction indicator 11 to the first off-period ToffL.

When the current signal IS falls below the threshold value Ith while the lighting process is repeated, the process proceeds from S109 to S114. At S114, the control device 13 sets the off-period Thoff of the direction indicator 11 to the second off-period ToffS. Thus, when a disconnection is detected from when the second on-period TonS elapses to when the first on-period TonL elapses, the second off-period ToffS is set for providing the short second period TS.

At S111, the control device 13 outputs an off-signal CS-off. Accordingly, the direction indicator 11 is turned off. At S112, the control device 13 measures the actual off-period Toff of the direction indicator 11. At S113, the control device 13 determines whether the actual off-period Toff exceeds the off-period Thoff. When the control device 13 determines that the actual off-period Toff does not exceed the off-period Thoff, the process returns to S112. Thus, until the actual off-period Toff exceeds the off-period Thoff, a loop from S112 to S113 is repeated. Accordingly, the direction indicator 11 is deenergized for the off-period Thoff. The process from S111 to S113 provides a putting-out process. The loop from S112 to S113 provides an off-loop in which the off-state by the off-signal CS-off is maintained during the first off-period ToffL or the second off-period ToffS. After S113, the process returns to S101. Thus, the direction indicator 11 is turned on and off repeatedly.

In a case where the putting-out process is performed after S110, the direction indicator 11 is put out for the first off-period ToffL. Thus, after the direction indicator 11 is lighted for the first on-period TonL, the direction indicator 11 is put out for the first off-period ToffL. As a result, when a disconnection is not detected, the direction indicator 11 blinks with the first period TL. In other words, when a disconnection is not detected, the control device 13 automatically switches from the on-loop to the off-loop after the first on-period TonL elapses. Thus, the direction indicator 11 is intermittently activated with the first period TL.

In a case where the putting-out process is performed after S114, the direction indicator 11 is put out for the second off-period ToffS. The putting-out process is performed after the direction indicator 11 is lighted at least for the second on-period TonS. Thus; when a disconnection is detected, the direction indicator 11 blinks with the second period TS which is shorter than the first period TL. Furthermore, in a case where a disconnection is detected while the direction indicator 11 is lighted, the direction indicator 11 is put out, and then the direction indicator 11 blinks with the second period TS. In other words, during the first on-period TonL after the elapse of the second on-period TonS, the disconnection detection is repeated. Thus, generation of a disconnection can be quickly detected. When a disconnection is detected, the process performed by the control device 13 switches from the on-loop to the off-loop through S109. After a disconnection is detected, the process switches from the on-loop to the off-loop as a result of the disconnection detection performed just after the elapse of the second on-period TonS. Therefore, when a disconnection is detected, the direction indicator 11 is intermittently activated with the second period TS.

Figure 3:
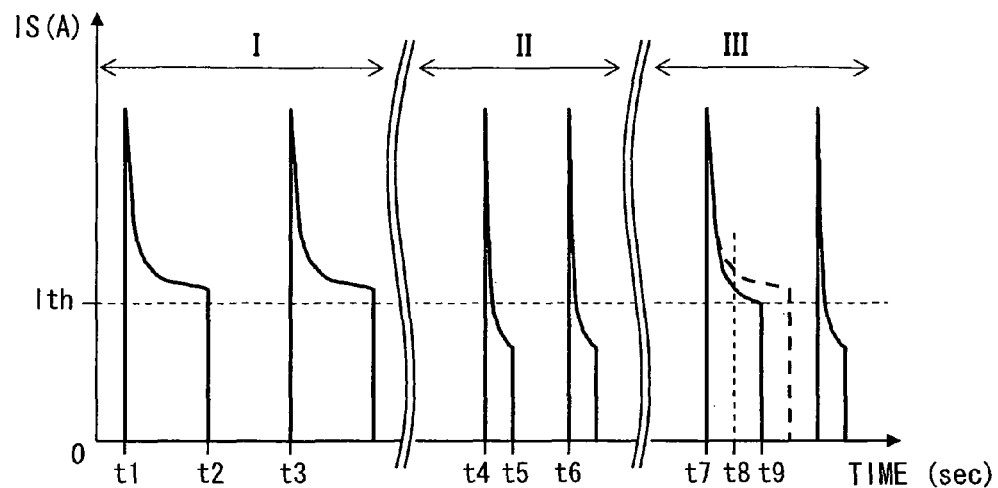
FIG. 3 is a graph showing a supply current in the energization control apparatus.
Figure 4:
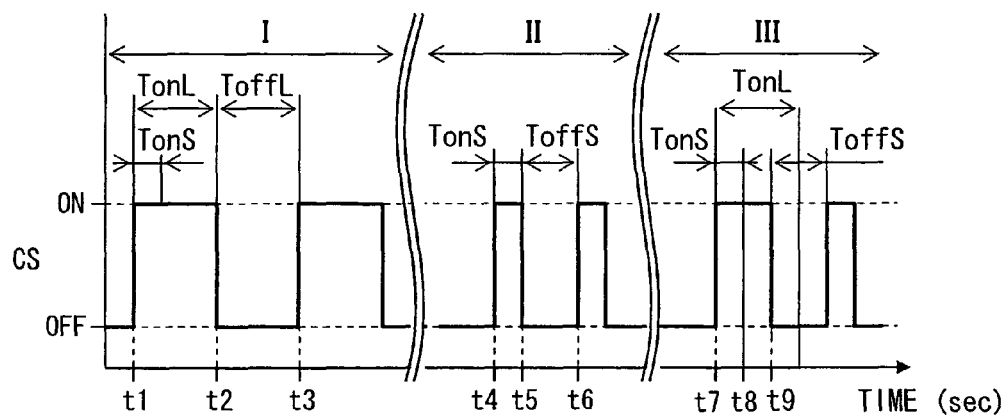
FIG. 4 is a graph showing a control signal in the energization control apparatus.
Figure 5:
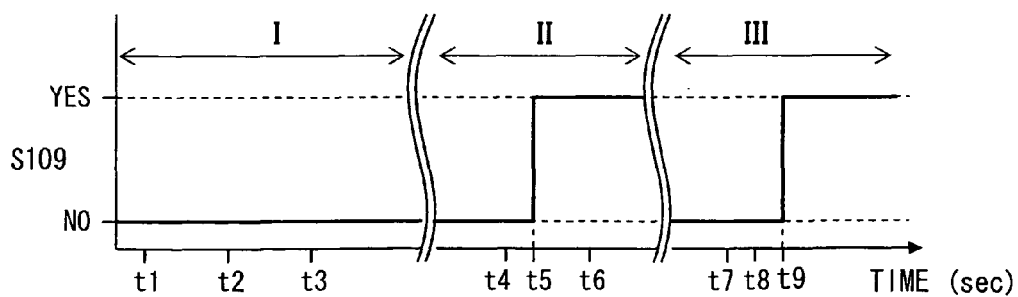
FIG. 5 is a graph showing a determination result of a disconnection detecting process.

The period I in FIG. 3, FIG. 4, and FIG. 5 indicates a normal state where a disconnection does not occur in the direction indicator 11. When a user operates the instruction device 12, the instruction device 12 outputs the instruction signal SS. Based on the instruction signal SS, the control device 13 alternately switches the control signal CS between the on-signal CS-on and the off-signal CS-off. At t1, when the control device 13 outputs the on-signal CS-on at S104, the direction indicator 11 is lighted. At the time, an inrush current flows to the direction indicator 11 just after the energization is started. Thus, the current signal IS has a large value transiently. When the second on-period TonS elapses since the control portion 13b starts to energize the direction indicator 11, the direction detecting process from S108 to S109 is performed. Because a disconnection of the direction indicator 11 does not occur in the period I, the current signal IS is not less the threshold value Ith. Thus, the disconnection detecting portion 13c in the control device 13 does not detect a disconnection.

When the first on-period TonL elapses since the control portion 13b starts to energize the direction indicator 11, at t2, the control device 13 outputs the off-signal CS-off at S111. As a result, the direction indicator 11 is put out. At t2, the current signal IS returns to 0. After that, the control device 13 repeats the loop from S112 to S113. When the first off-period ToffL elapses, at t3, the control device 13 deviates from the loop from S112 to S113. Then, the process proceeds to S104 again, and the direction indicator 11 is turned on again. By repeating the above-described operation, the direction indicator 11 repeatedly blinks with the first period TL.

The period II in FIG. 3, FIG. 4, and FIG. 5 indicates a malfunction state where a disconnection occurs in a part of the loads in the direction indicator 11. At t4, when the control device 13 outputs the on-signal CS-on at S104, only the normal light emitting elements in the direction indicator 11 are lighted. At the time, an inrush current flows to the direction indicator 11 just after the energization is started. After that, because a part of the loads is disconnected, the current value rapidly decreases and falls below the threshold value Ith. In the example shown in FIG. 3, FIG. 4, and FIG. 5, the current signal IS falls below the threshold value Ith before the elapse of the second on-period Tons. Also in this case, the process does not proceed to S109 until the second on-period TonS elapses. Thus, the on-state is kept at least for the second on-period TonS.

When the second on-period TonS elapses since the control portion 13b starts to energize the direction indicator 11, at t5, the disconnection detecting portion 13c detects the disconnection at S109. Then, the control device 13 outputs the off-signal CS-off at S111. In this case, the switching portion 13d sets the off-period Thoff to the second off-period ToffS at S114. Thus, the direction indicator 11 is put out for the second off-period ToffS. After the second off-period ToffS elapses, at t6, the control device 13 deviates from the loop from S112 to S113. Then, the process proceeds to S104 again, and the direction indicator 11 is turned on again. By repeating the above-described operation, the direction indicator 11 repeatedly blinks with the second period TS which is shorter than the first period TL.

The period III in FIG. 3, FIG. 4, and FIG. 5 indicates a case where a disconnection occurs during the energization to the direction indicator 11 or a case where a decrement of current due to a disconnection is small. At t7, when the control device 13 outputs the on-signal CS-on at S104, the direction indicator 11 is turned on. At the time, an inrush current flows to the direction indicator 11. When a disconnection occurs in a part of the loads after t7, the current signal IS decreases faster than the normal state. When a load having a small rated current is disconnected, the current signal IS decreases at a speed faster than the normal state and slower than a case where a load having a large rated current is disconnected.

The disconnection detecting process from S108 to S109 is started after the second on-period TonS elapses since the control portion 13b starts to energize the direction indicator 11. Thus, after t8, the disconnection detection is started. In a case where the current signal IS falls below the threshold value Ith before the second on-period TonS elapses since the control portion 13b starts to energize the direction indicator 11, the operation same as the period II is performed.

In a case where the current signal IS falls below the threshold value Ith after the second on-period TonS elapses since the control portion 13b starts to energize the direction indicator 11, at t9 when the current signal IS falls below the threshold value Ith, the disconnection detecting portion 13c detects the disconnection at S109. Then, the control device 13 outputs the off-signal CS-off at S111. Thus, the on-state is kept at least for the second on-period TonS. In this case, the switching portion 13d sets the off-period Thoff to the second off-period ToffS. Thus, the direction indicator 11 is put out for the second off-period ToffS. After the second off-period ToffS elapses, the control device 13 deviates from the loop from S112 to S113. Then, the process proceeds to S104 again, and the direction indicator 11 is turned on again. By repeating the above-described operation, the intermittent period of the direction indicator 11 is switched from the first period TL to the second period TS.

The energization control apparatus 10 according to the present embodiment can reduce influence of an inrush current and can detect a disconnection. In addition, because the disconnection detection is repeatedly performed after the second on-period TonS for reducing influence of an inrush current elapses, a disconnection during the energization period can be quickly detected. Furthermore, the direction indicator 11 can blink with the second period TS just after a disconnection is detected. Because the energization to the direction indicator 11 is kept for the second on-period TonS for reducing influence of an inrush current, the energization period does not become shortened excessively. As a result, the second period TS can be provided with certainty. Furthermore, influence of an inrush current can be reduced with the second on-period TonS for the second period TS.

(Other Embodiments)

Although the present invention has been fully described in connection with the preferred embodiments thereof with reference to the accompanying drawings, it is to be noted that various changes and modifications will become apparent to those skilled in the art.

For example, the control portion 13b, the disconnecting detecting portion 13c, the switching portion 13d, and the prohibiting portion 13e in the control device 13 and the above-described functions of the control device 13 may be provided by only software, only hardware, or a combination of software and hardware. For example, the control device 13 may include an analog circuit.

What is claimed is:

1. An energization control apparatus comprising:
a control portion that controls energization to a plurality of loads coupled in parallel;
a disconnection detecting portion that repeatedly determines whether a supply current to the plurality of loads is less than a threshold value when the control portion energizes the plurality of loads, and detects a disconnection of a part of the plurality of loads when the supply current is less than the threshold value; and
a prohibiting portion that prohibits a disconnection detection by the disconnection detecting portion for a predetermined period since the control portion starts to energize the plurality of loads, and enables the disconnection detection by the disconnection detecting portion after the predetermined period elapses,
wherein the control portion alternately switches the energization to the plurality of loads between an on-state and an off-state,
the energization control apparatus further comprising a switching portion that sets a period of the on-state and the off-state to a first period when the disconnection detecting portion does not detect the disconnection and sets the period of the on-state and the off-state to a second period shorter than the first period when the disconnection detecting portion detects the disconnection,
wherein the predetermined period is an on-period for the second period, and
wherein the control portion includes an on-loop in which the control portion keeps the on-state until a first on-period for the first period elapses after a second on-period for the second period elapses and an off-loop in which the control portion keeps the off-state until a first off-period for the first period or a second off-period for the second period elapses after the first on-period elapses,
wherein the switching portion switches the first off-period and the second off-period in the off-loop,
wherein the disconnection detecting portion performs the disconnection detection when the control portion is in the on-loop, and
wherein the control portion changes from the on-loop to the off-loop when the disconnection detecting portion detects the disconnection.

2. The energization control apparatus according to claim 1, wherein the control portion includes a portion that interrupts the energization to the plurality of loads when the disconnection detecting portion detects the disconnection, and
wherein the switching portion includes a portion that switches a period of the off-state after the disconnection detecting portion detects the disconnection to the second off-period for the second period.

* * * * *